(12) United States Patent
Brooks (10) Patent No.: US 9,565,060 B2
(45) Date of Patent: Feb. 7, 2017

(54) MANAGING A NETWORK CONNECTION FOR USE BY A PLURALITY OF APPLICATION PROGRAM PROCESSES

(71) Applicant: INTERNATIONAL BUSINESS MACHINES CORPORATION, Armonk, NY (US)

(72) Inventor: Michael D. Brooks, Rownhams (GB)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 14/376,497

(22) PCT Filed: Feb. 4, 2013

(86) PCT No.: PCT/IB2013/050935
§ 371 (c)(1),
(2) Date: Aug. 4, 2014

(87) PCT Pub. No.: WO2013/118044
PCT Pub. Date: Aug. 15, 2013

(65) Prior Publication Data
US 2014/0379934 A1 Dec. 25, 2014

(30) Foreign Application Priority Data
Feb. 10, 2012 (GB) .................... 1202318.0

(51) Int. Cl.
*G06F 15/16* (2006.01)
*H04L 12/24* (2006.01)
(Continued)

(52) U.S. Cl.
CPC ....... *H04L 41/0823* (2013.01); *H04L 43/0888* (2013.01); *H04L 67/142* (2013.01)

(58) Field of Classification Search
CPC . H04L 41/0823; H04L 43/0888; H04L 67/142
(Continued)

(56) References Cited

U.S. PATENT DOCUMENTS

| | | | |
|---|---|---|---|
| 5,583,860 A | 12/1996 | Iwakawa et al. | |
| 5,970,064 A * | 10/1999 | Clark | .......... H04L 41/0813 370/242 |

(Continued)

FOREIGN PATENT DOCUMENTS

| | | |
|---|---|---|
| CN | 1723674 | 1/2006 |
| CN | 101431473 | 5/2009 |

(Continued)

OTHER PUBLICATIONS

United Kingdom Intellectual Property Office Application No. GB1202318.0—Search Report mailed Jun. 7, 2012.
(Continued)

*Primary Examiner* — Thu Ha Nguyen
(74) *Attorney, Agent, or Firm* — Law Office of Jim Boice (57) ABSTRACT

A method, system, and/or computer program product manages a network connection for use by a plurality of application program processes. A set of application program processes, which utilize a network connection, are categorized into a plurality of categories. An optimum network connection parameter value is identified for each category of application program processes. A network connection is established for use by the set of application program processes. A usage of the network connection is determined by each of the application program processes. A network connection parameter is set for the network connection dependent on a respective usage and optimum network connection parameters of the application program processes.

17 Claims, 6 Drawing Sheets

(51) Int. Cl.
*H04L 12/26* (2006.01)
*H04L 29/08* (2006.01)

(58) Field of Classification Search
USPC .............................. 709/221, 228, 220, 229
See application file for complete search history.

(56) References Cited

U.S. PATENT DOCUMENTS

| | | | |
|---|---|---|---|
| 6,427,152 B1* | 7/2002 | Mummert | |
| 6,741,567 B1 | 5/2004 | Klein | |
| 7,349,414 B2 | 3/2008 | Sandstrom | |
| 7,414,990 B2 | 8/2008 | Gilliland et al. | |
| 7,477,659 B1* | 1/2009 | Nee ...................... | H04W 28/20 370/310 |
| 8,014,273 B1* | 9/2011 | Barrett ................ | H04L 41/0896 370/210 |
| 8,495,648 B1* | 7/2013 | Brandwine ............ | G06F 9/505 709/226 |
| 8,739,170 B1* | 5/2014 | Gupta ...................... | G06F 9/54 718/104 |
| 2004/0015582 A1* | 1/2004 | Pruthi ..................... | H04L 41/22 709/224 |
| 2004/0136379 A1* | 7/2004 | Liao ................... | H04L 12/5695 370/395.21 |
| 2006/0041664 A1 | 2/2006 | Kalos et al. | |
| 2006/0133418 A1* | 6/2006 | Anand ................ | H04L 12/5695 370/468 |
| 2008/0049630 A1* | 2/2008 | Kozisek .............. | H04L 41/0823 370/250 |
| 2008/0225717 A1* | 9/2008 | Chen .................... | H04W 28/02 370/235 |
| 2009/0100435 A1* | 4/2009 | Papaefstathiou ..... | G06F 9/5011 718/104 |
| 2009/0180430 A1* | 7/2009 | Fadell ................ | H04L 12/5695 370/329 |
| 2010/0208585 A1 | 8/2010 | Witzel et al. | |
| 2010/0246401 A1* | 9/2010 | Woundy .............. | H04L 12/2801 370/236 |
| 2010/0290362 A1 | 11/2010 | Croot et al. | |
| 2011/0019531 A1* | 1/2011 | Kim ...................... | G06F 11/203 370/216 |
| 2011/0126206 A1* | 5/2011 | Kato ....................... | G06F 1/206 718/103 |
| 2012/0036513 A1 | 2/2012 | Choong | |
| 2012/0072762 A1* | 3/2012 | Atchison ............... | G06F 9/5072 714/2 |
| 2012/0271947 A1 | 10/2012 | Kirkup et al. | |
| 2013/0024568 A1* | 1/2013 | Popczynski ........... | G06F 9/4843 709/224 |
| 2013/0117438 A1* | 5/2013 | Gupta ................... | G06F 9/5011 709/224 |
| 2014/0094159 A1* | 4/2014 | Raleigh ................. | H04W 24/02 455/418 |
| 2014/0143391 A1* | 5/2014 | Tanigawa ............ | G06F 9/45558 709/221 |
| 2015/0016253 A1* | 1/2015 | Jaska ...................... | H04L 47/22 370/230.1 |
| 2015/0324255 A1* | 11/2015 | Kochunni ........... | G06F 11/1469 711/162 |
| 2016/0094424 A1* | 3/2016 | Niestemski ......... | H04L 41/0823 709/224 |
| 2016/0261510 A1* | 9/2016 | Burnette ............. | H04L 43/0882 |

FOREIGN PATENT DOCUMENTS

| | | |
|---|---|---|
| CN | 101499021 A | 8/2009 |
| CN | 101977146 A | 2/2011 |
| CN | 102239668 | 11/2011 |
| CN | 102239668 A | 11/2011 |
| DE | 19530731 | 2/1997 |
| WO | 2011044926 A1 | 4/2011 |

OTHER PUBLICATIONS

International Searching Authority, International Search Report and Written Opinion for PCT/IB2013/050935 mailed Jun. 27, 2013.

* cited by examiner

| NRDT | | | | | | | | | |
|---|---|---|---|---|---|---|---|---|---|
| Workload Type (Optimum NCP Allocation) | Network Connection Parameter Allocation / Percentage of Network Connection Usage | | | | | | | | |
| | 10% | 20% | 30% | 40% | 50% | 60% | 70% | 80% | 90% |
| DBA (8) | 2 | 3 | 4 | 4 | 5 | 6 | 6 | 7 | 8 |
| RPC (2) | 8 | 7 | 6 | 6 | 5 | 4 | 4 | 3 | 2 |

MANAGING A NETWORK CONNECTION FOR USE BY A PLURALITY OF APPLICATION PROGRAM PROCESSES

BACKGROUND

The present invention relates to managing a network connection for use by a plurality of application program processes.

Computer systems are commonly connected to a network and run application programs that communicate over the network with application programs running on other computers on the network. The processing of an application program may comprises a set of sub-processes or application program processes, such as database access processes or remote procedure call processes, that interact with the application programs running on the other computers on the network.

The capacity of a network connection can be configured to match the requirements of its expected workload. Such configuration may be performed by setting one or more parameters of the network connection. For example, given a network connection using the Transmission Control Protocol/Internet Protocol (TCP/IP) for the transport layer, the number of sockets may be set so as to provide appropriate level of connection capacity for the network connection. However some workloads may benefit from one particular configuration, which may not be best suited to that of other workloads.

SUMMARY

A method, system, and/or computer program product manages a network connection for use by a plurality of application program processes. A set of application program processes, which utilize a network connection, are categorized into a plurality of categories. An optimum network connection parameter value is identified for each category of application program processes. A network connection is established for use by the set of application program processes. A usage of the network connection is determined by each of the application program processes. A network connection parameter is set for the network connection dependent on a respective usage and optimum network connection parameters of the application program processes.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
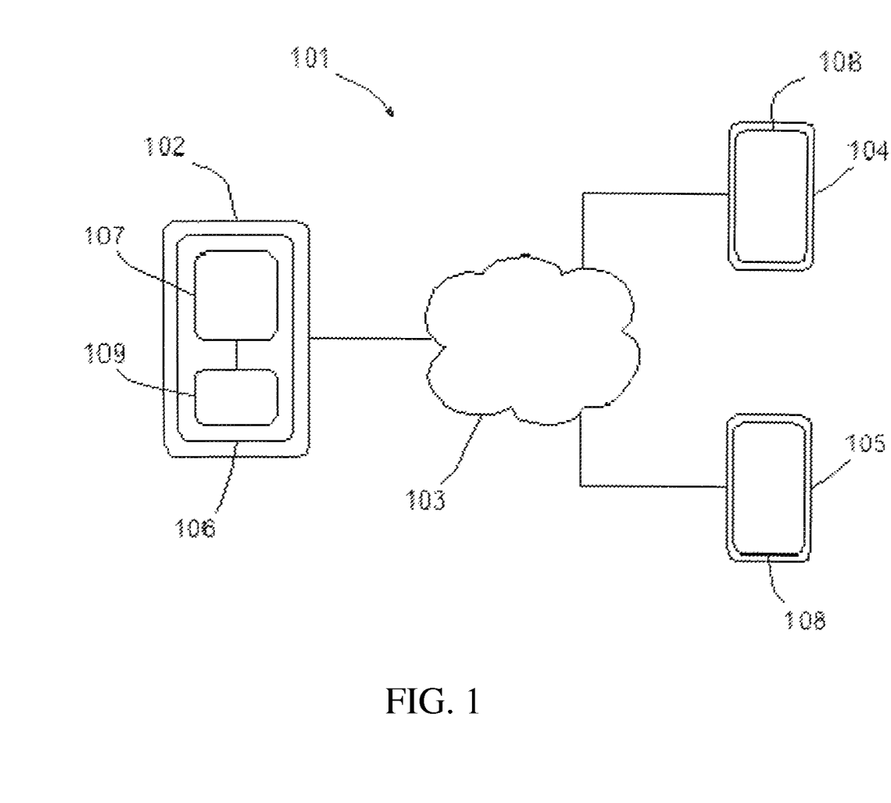
FIG. 1 is a schematic illustration of a network of computers in which one of the computers is provided with a program for managing a network connection for use by a plurality of application program processes.

With reference to FIG. 1, a computer system 101 comprises a first computer 102 connected via a network 103 to second and third computers 104, 105. The first computer 102 is provided with an operating system 106 arranged to provide a processing platform for one or more application programs. In the present embodiment, the first computer is loaded with a data processing application program 107. The data processing application 107 is arranged to use a network connection provided over the network 103 to interact with application programs 108 running on the other computers 104, 105. The interaction of the data processing application 107 over the network 103 may comprise two or more types or categories of application program processes such as database access processes or remote procedure call processes. In the present embodiment a network monitoring application program 109 is provided on the first computer 102 which is arranged to optimise the network connection between the first computer 102 and the other computers 104, 105 taking into account the usage of the network connection by the relevant categories of application program processes.

Figure 2:
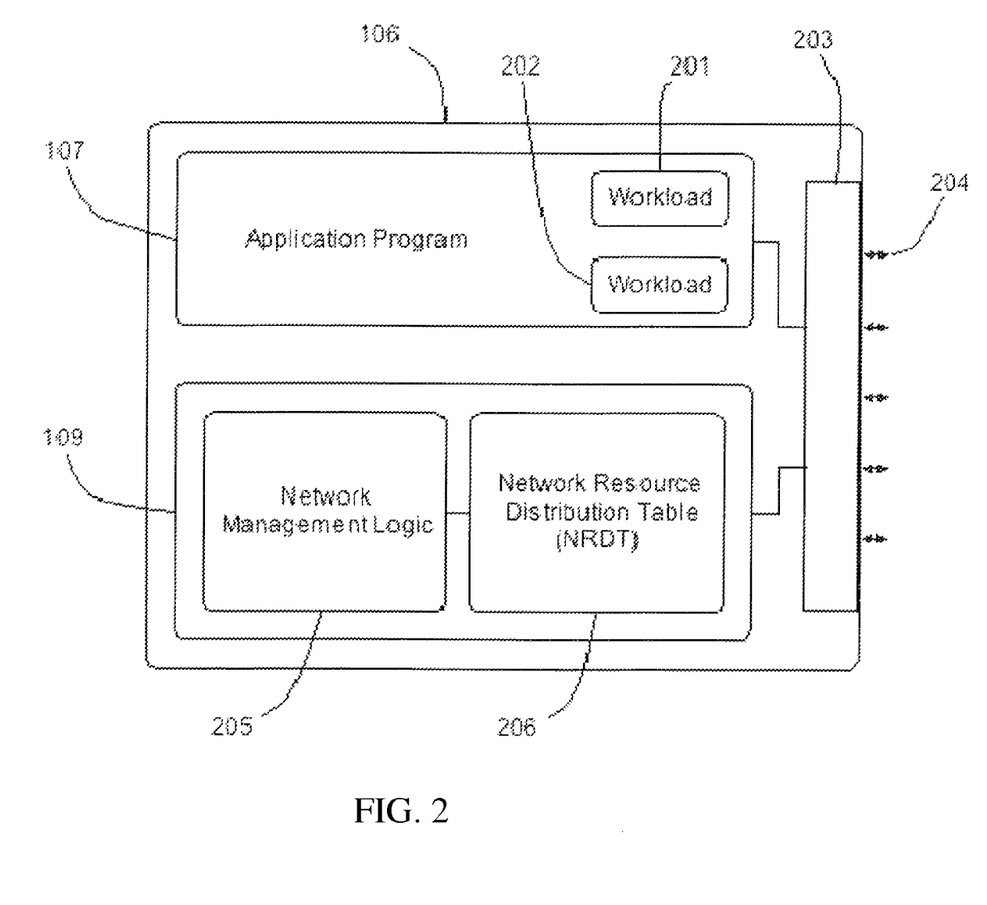
FIG. 2 is a schematic illustration showing further detail of the computer comprising the program for managing a network connection of FIG. 1.

With reference to FIG. 2, in the present embodiment, the application program 107 comprises two categories of application program processes or workloads 201, 202. The workloads 201, 202 access the network 103 via a network interface 203 provided by the operating system 106. In the present embodiment, the network interface 203 uses the Transmission Control Protocol/Internet Protocol (TCP/IP) at the transport layer. Each TCP/IP network connection comprises a number of sockets 204 in the form of internet sockets. The number of sockets in a given network connection governs the capacity of the connection. In other words, the more sockets 204 provided for a given network connection the greater the bandwidth of that connection. The network interface 203 provides an interface that enables the network monitoring application program 109 to control a predetermined set of parameters for a given network connection. Thus the number of sockets 204 provided for a network connection by the network interface 203 is a network connection parameter that is externally controllable by the network monitoring application program 109.

The network monitoring application program 109 comprises network management logic 205 and a network resource distribution table (NRDT) 206. The network management logic 205 is arranged to monitor the usage of a network connection by each category of workload 201, 202 and to balance a parameter of the network connection to best suit the requirements of those workloads 201, 202, taking into account the relative proportions of their respective use of the network connection. The optimal values of the network connection parameter for each category of workload 201, 202 are predetermined as described in further detail below.

In the present embodiment, the network connection parameter is the number of sockets provided for a given network connection. The network management logic 205 is arranged to balance the number of sockets provided in a given network connection taking into account a predetermined optimum number of sockets for each category of workload 201, 202 and their respective proportions of usage of the network connection in a given period. In the present embodiment, the proportion of each category of workload in any given period is calculated as the number of network accesses by applications program processes of the relevant category. In other words, the proportion of application program processes accessing the monitored network connection that comprises database accesses or the proportion that comprises remote procedure calls. In the present embodiment, the NRDT 206 comprises a predetermined set of values for the network connection parameter for each category of workload corresponding to the range of proportions of usage.

Figure 3:
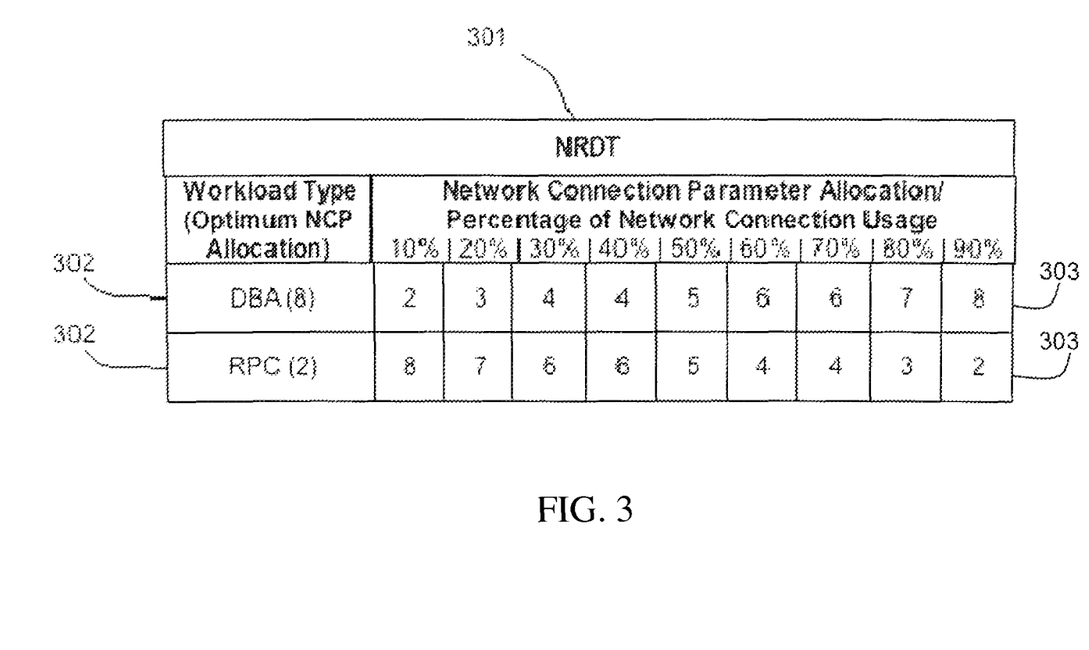
FIG. 3 is a table of network connection parameter settings for use in the program of FIG. 2.

With reference to FIG. 3, in the present embodiment, the NRDT 206 is provided in the form of a look-up table 301 having a line 302 for each workload type 201, 202. Each line 302 specifies the predetermined optimum value of the network connection parameter (NCP) for the workload 201, 202 and a balanced set of values 303 for the NCP taking into account the percentage of the network connection utilized by the workload in a given period. In the present embodiment, the set of NCP values 303 in the NRDT 206 are spread between the highest and lowest optimum NCP values. Thus, in the present embodiment, the NCP values are balanced between an optimum NCP value of 8 for database access (DBA) processes and a value of 2 for remote procedure call (RPC) processes. The greater the proportion of the network connection utilized by a given category of workload, the closer the NCP setting is to the optimum NCP value for that workload category. For example, from the NRDT 206, if in a given monitoring period database access (DBA) processes comprise 90% or more of the network connection usage then the number of sockets for the connection is set to 8 for the subsequent period. If the network connection usage is evenly distributed between DBA and RPC processes then the number of sockets will be balanced to a setting of 5 for the subsequent period.

In the present embodiment, the network monitoring application program 109 is arranged to monitor the usage by the application program 107 of a network connection over predetermined time periods. When the application program 107 sets up a network connection via the network interface 203, the network monitoring application program 109 is provided with access to the statistical data for the connection and details of the messages sent over the network connection. The network monitoring application program 109 is arranged to record data representing the category of workload a given message represents. The recorded workload data is then inspected at the end of each monitoring period to determine the relative proportions of the categories of workloads in that monitoring period. The network monitoring application program 109 is arranged, if necessary, to rebalance the NCP in accordance with the values 303 defined in the NRDT 206.

Figure 4:
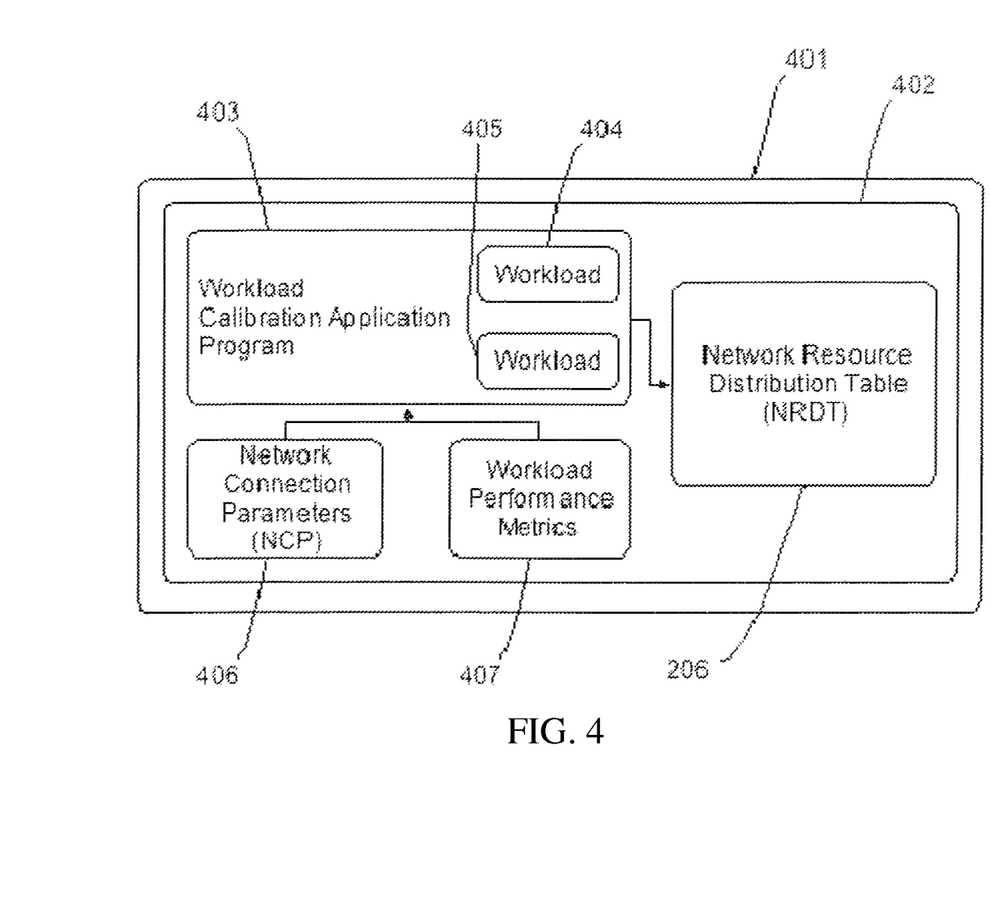
FIG. 4 is a schematic illustration of a computer system for determining an optimum network connection parameter for use in the program of FIG. 2.

With reference to FIG. 4, a computer 401 is loaded with an operating system 402 that provides a processing environment for a workload calibration application program 403. The workload calibration application program 403 is arranged to provide a test environment for determining the optimum NCP values for selected categories of workload. Workloads 404, 405 are selected as examples of two or more predetermined categories of workload relevant to a given application program that will be subsequently monitored by the network monitoring application program 109. In the present embodiment, the workloads 404, 405 comprise examples of a database access (DBA) process and a remote procedure call (RPC) process.

The performance of the selected workloads 404, 405 during testing is measured with respect to one or more selected workload performance metrics 407 in order to determine the optimum value of one or more selected network connection parameters (NCPs) 406. The testing performed by the workload calibration application program 403 is arranged to determine the optimum NCP values from the peaks in the selected performance metric 407 of a given workload 404, 405 during its testing. The optimum NCP values determined for the test workloads 404, 405 are associated with the relevant category of workload in the NRDT 206. The set of balanced NCP values 303 are then calculated in accordance with a predetermined function. In the present embodiment, the balanced NCP values 303 are linearly distributed over the range of possible NCP values bounded by the highest and lowest optimum NCP values determined for the relevant test workloads 404, 405. As shown in the example of FIG. 3, the set of balanced NCP values 303 are also rounded to fit each 10% usage band.

Figure 5:
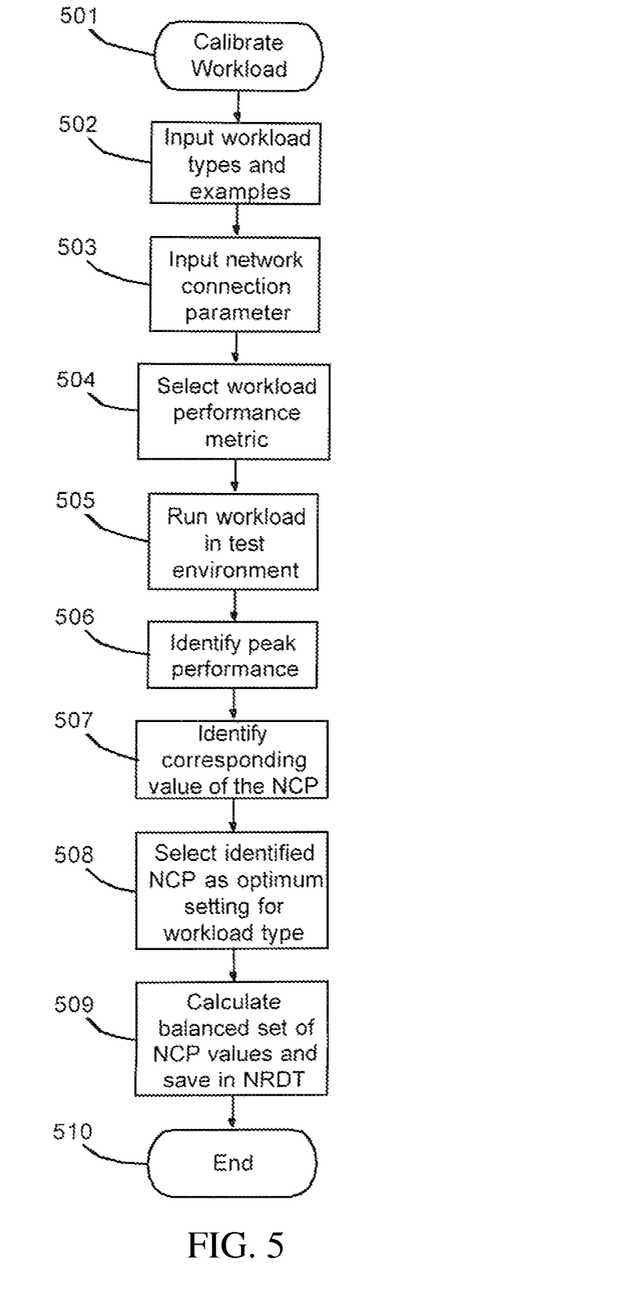
FIG. 5 is a flow chart illustrating processing performed by the program of FIG. 4 when determining an optimum network connection parameter.

The processing performed by the workload calibration application program 403 to produce the data for the NRDT 206 will now be described with reference to the flow chart of FIG. 5. Processing is initiated at step 501 and moves to step 502 where a user selects the categories of workload and inputs corresponding examples and processing moves to step 503. At step 503 the user selects the relevant network connection parameter 406 for each workload category and processing moves to step 504. At step 504 the user selects a workload performance metric 407 for each workload category and processing moves to step 505. At step 505 each workload example 404, 405 is run against the test environment and processing moves to step 506. At step 506 the peak value of the performance metric for each test is identified and processing moves to step 507. At step 507 the value of the NCP corresponding to each peak value of the performance metric is identified for each workload category and processing moves to step 508. At step 508 the identified NCP values are entered into the NRDT 206 as the optimum NCP for the relevant workload categories and processing moves to step 509. At step 509 the set of balanced NCP values 303 are calculated in accordance with the predetermined function and entered in the completed NRDT 206 for use by the network monitoring application program 109. Processing then moves to step 510 and ends.

Figure 6:
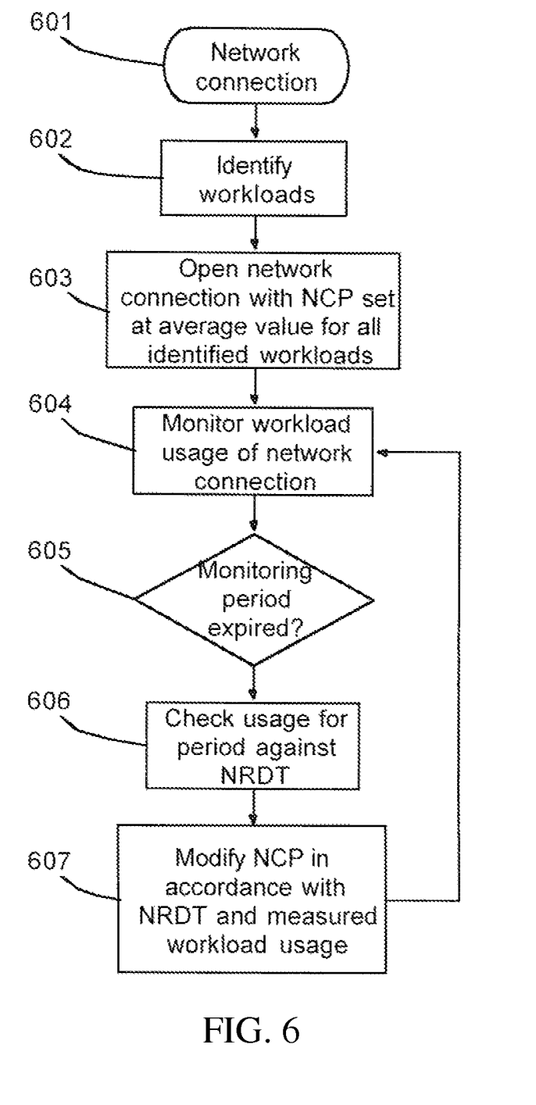
FIG. 6 is a flow chart illustrating processing performed by the program of FIG. 2 when managing a network connection.

The processing performed by the network monitoring application program 109 when monitoring the usage of a network connection by a plurality of workloads will now be described further with reference to FIG. 6. Processing is initiated at step 601 in response to the set up of a network connection and processing moves to step 602. At step 602 the workloads to be monitored are identified in the NRDT 206 and processing moves to step 603. At step 603 the relevant NCP for the network connection is set initially to the average of the optimum NCP values from the NRDT 206 for each identified workload and processing then moves to step 604. At step 604 the usage of the network connection by the relevant workloads is monitored and processing moves to step 605. At step 605 processing waits until the monitoring period is complete before moving to step 606. At step 606 the usage statistics for the workloads in the completed monitoring period are collected and processing moves to step 607. At step 607 the usage data is used to index the NRDT 206 and select the setting of the NCP for the next monitoring period. Processing then returns to step 604 and proceeds as described above until the network connection is closed.

As will be appreciated by those skilled in the art, a network connection is created between two computers with corresponding compatible network interface functionality. Most changes in a network connection parameter (NCP) made by the network connection functionality of one of the computers will commonly be negotiated and matched by the connection functionality of the other computer.

In a further embodiment of the invention the monitoring period of the network monitoring application program is determined by a non-time based measure such as the number of application program process accesses made or the volume of data that has passed over the over the network connection.

As will be appreciated by those skilled in the art, any suitable distribution function or algorithm may be used for determining the set of balanced NCP values. In some embodiments, one or more selected workloads may be specifically weighted so that the set of balanced NCP values is biased to their respective optimum NCP value.

As will be understood by those skilled in the art, the network control parameter may be any suitable network parameter that affects the performance of one or more categories of workflow with respect to the associated workload performance metric. For example, the NCP may be the number of concurrent requests that a connection supports, the size of data in individual messages or the depth of the queue of work waiting to use a connection. The network parameter may be dependent on the type of network connection in a given application or the type of transport layer protocol selected for a given network connection. Network connections monitored by embodiments of the invention may be provided at the transport layer by any applicable protocol such as TCP, User Datagram Protocol (UDP) or Stream Control Transmission Protocol (SCTP).

As will be understood by those skilled in the art, the workload performance metric may be any suitable measure of the performance of a given application process or workload. Different categories of workload may be calibrated against differing respective workload performance metric to determine their respective optimum NCPs for use in embodiments of the invention for monitoring those categories of workload on the same network connection.

As will be understood by those skilled in the art, the calibration of a given workload category may be performed by running any number of examples of the relevant application program process in the test environment. Where two or more examples are tested, their results may be combined, for example, by averaging, to determine the associated optimum NCP with respect to the relevant workload performance metric.

In another embodiment the calibration of a given workload category is performed during live operation of a relevant application program. Calibration of the optimum NCP may be performed during periods when the relevant workload has sole usage of the relevant network connection. The calibration process may be arranged to actively exclude other workload categories from the network connection during the calibration process.

In a further embodiment, each time a network connection being monitored by the network monitoring application program is closed, the value of the relevant NCP at closure is recorded. On set-up of a new network connection, the recorded NCP for the prior connection is used as the initial value for the NCP of the new connection.

As will be understood by those skilled in the art, the usage of the network connection by the relevant workloads may be measured in relation to any suitable throughput metric. For example, path-length, that is, the number of machine instructions executed between the point where an instance of a workload issues a request to send a message over the network, and when the workload resumes processing control having successfully done so. This may also be referred to as the CPU cost and the response time, that is, the time taken between issuing a request and getting control back.

As will be understood by those skilled in the art, the NRDT data may be represented in any suitable manner and may, for example, be hard-coded into the network monitoring application program.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

A method and apparatus is disclosed for managing a network connection for use by a plurality of application program processes.

An embodiment of the invention provides a method for managing a network connection for use by a plurality of application program processes, the method comprising the steps of: categorising a set of application program processes, that utilise a network connection, into a plurality of categories; identifying an optimum network connection parameter value for each category of application program process; establishing a network connection for use by the application program processes; determining the usage of the network connection by each of the application program processes; and setting the network connection parameter for the network connection in dependence on the respective usage and optimum network connection parameters of the application program processes.

The usage of the network by the application program processes may be determined at predetermined intervals and the network connection parameter set accordingly. The predetermined interval may be defined as a time period. The predetermined interval may be defined as a throughput measure. The network connection parameter may be associated with the capacity of the network connection. The network connection parameter may be a parameter of the transport layer of the network connection. The network connection may be a TCP/IP connection and the network connection parameter is the number of sockets provided for the network connection.

The network connection parameter mat be set in accordance with a predetermined set of network connection parameter settings each associated with a given relative proportions of usage of the network connection by the application program processes and the respective optimum network connection parameter. On initiation of the network connection the network connection parameter may be set to a median or average of the workload optimum network connection parameters. On initiation of the network connection the network connection parameter may be set to the value of the network connection parameter on closure of a prior network connection. The optimum network connection parameter value for each category of application program process may be determined using a performance metric associated with the application program process, the optimum network connection parameter value being selected based on a peak in the performance metric for an application program process of a given category. The optimum network connection parameter value may be selected based on a peak in the performance metric for one of the application program processes running in a test environment.

Another embodiment provides apparatus for managing a network connection for use by a plurality of application program processes, the apparatus being operable to: categorise a set of application program processes, that utilise a network connection, into a plurality of categories; identify an optimum network connection parameter value for each category of application program process; establish a network connection for use by the application program processes; determine the usage of the network connection by each of the application program processes; and set the network connection parameter for the network connection in dependence on the respective usage and optimum network connection parameters of the application program processes.

A further embodiment provides a computer program stored on a computer readable medium and loadable into the internal memory of a computer, comprising software code portions arranged, when the program is run on a computer, for performing a method for managing a network connection for use by a plurality of application program processes, the method comprising the steps of: categorising a set of application program processes, that utilise a network connection, into a plurality of categories; identifying an optimum network connection parameter value for each category of application program process; establishing a network connection for use by the application program processes; determining the usage of the network connection by each of the application program processes; and setting the network connection parameter for the network connection in dependence on the respective usage and optimum network connection parameters of the application program processes.

The invention claimed is:

1. A method for managing a network connection for a network in use by a plurality of application program processes, the method comprising:
   categorizing, by one or more processors, a set of application program processes, that utilize a network connection, into a plurality of categories;
   identifying, by one or more processors, an optimum network connection parameter value for each category of application program process;
   establishing, by one or more processors, a network connection for use by the set of application program processes;
   determining, by one or more processors, a usage of the network connection previously used by each of the set of application program processes in a prior test communication session;
   setting, by one or more processors, a network connection parameter for the network connection dependent on a respective prior test communication session usage and optimum network connection parameters of each application program process from the set of application program processes; and
   in response to an initiation of the network connection, setting, by one or more processors, a parameter value of a current network connection parameter to a parameter value of a prior network connection parameter at a point in time at which the prior network connection was terminated.

2. The method according to claim 1, wherein the usage of the network connection by each of the set of application program processes is determined at predetermined intervals, and wherein the method further comprises:
   setting, by one or more processors, the network connection parameter based on the usage of the network connection by each of the set of application program processes.

3. The method according to claim 2, wherein the predetermined intervals are defined as a time period.

4. The method according to claim 2, wherein the predetermined intervals are defined as a throughput measure.

5. The method according to claim 1, wherein the network connection parameter is associated with a capacity of the network connection.

6. The method according to claim 1, wherein the network connection parameter is a parameter of a transport layer of the network connection.

7. The method according to claim 1, wherein the network connection is a TCP/IP connection, and wherein the network connection parameter is a quantity of sockets provided for the network connection.

8. The method according to claim 1, wherein the network connection parameter is set in accordance with a predetermined set of network connection parameter settings, wherein each of the predetermined set of network connection parameter settings is associated with a given relative proportions of usage of the network connection by the set of application program processes and a respective optimum network connection parameter.

9. The method according to claim 1, further comprising:
   response to an initiation of the network connection, setting, by one or more processors, the network connection parameter to an average of workload optimum network connection parameters.

10. The method according to claim 1, further comprising:
    determining, by one or more processors, the optimum network connection parameter value for each category of the set of application program processes by using a performance metric associated with the set of application program processes, wherein the optimum network connection parameter value is selected based on a peak in a performance metric for an application program process of a given category.

11. The method according to claim 10, further comprising:
    selecting, by one or more processors, the optimum network connection parameter value based on a peak in the performance metric for one of the application program processes running in a test environment.

12. The method of claim 1, further comprising:
    determining, by one or more processors, the usage of the network connection according to a path length, wherein the path length is a quantity of machine instructions executed between a first point in time when an instance of a workload issues a request to send a message over the network and a second point in time when transmission and receipt of the message has completed.

13. A computer program product for managing a network connection for use by a plurality of application program processes, the computer program product comprising a computer readable storage medium having program code embodied therewith, wherein the computer readable storage medium is not a transitory signal per se, and wherein the program code is readable and executable by a processor to perform a method comprising:
    categorizing a set of application program processes, that utilize a network connection, into a plurality of categories;

identifying an optimum network connection parameter value for each category of the set of application program process;

establishing a network connection for use by the set of application program processes;

determining a usage of the network connection previously used by each of the set of application program processes in a prior test communication session;

setting a network connection parameter for the network connection dependent on a respective prior test communication session usage and optimum network connection parameters of each application program process from the set of application program processes; and in response to an initiation of the network connection, setting a parameter value of a current network connection parameter to a parameter value of a prior network connection parameter at a point in time at which the prior network connection was terminated.

14. The computer program product of claim 13, wherein the usage of the network connection by each of the set of application program processes is determined at predetermined intervals, and wherein the method further comprises:

setting the network connection parameter based on the usage of the network connection by each of the set of application program processes.

15. The computer program product of claim 13, wherein the method further comprises:

determining the optimum network connection parameter value for each category of the set of application program processes by using a performance metric associated with the set of application program processes, wherein the optimum network connection parameter value is selected based on a peak in a performance metric for an application program process of a given category.

16. A computer system comprising:

a hardware processor, a computer readable memory, and a computer readable storage medium;

first program instructions to categorize a set of application program processes, that utilize a network connection, into a plurality of categories;

second program instructions to identify an optimum network connection parameter value for each category of application program processes;

third program instructions to establish a network connection for use by the set of application program processes;

fourth program instructions to determine a usage of the network connection previously used by each of the set of application program processes in a prior test communication session;

fifth program instructions to set a network connection parameter for the network connection dependent on a respective prior test communication session usage and optimum network connection parameters of each application program process from the set of application program processes; and sixth program instructions to, in response to an initiation of the network connection, set a parameter value of a current network connection parameter to a parameter value of a prior network connection parameter at a point in time at which the prior network connection was terminated; and wherein the first, second, third, fourth, fifth, and sixth program instructions are stored on the computer readable storage medium and executed by the processor via the computer readable memory.

17. The computer system of claim 16, wherein the usage of the network connection by each of the application program processes is determined at predetermined intervals, and wherein the computer system further comprises:

seventh program instructions to set the network connection parameter based on the usage of the network connection by each of the set of application program processes; and wherein the seventh program instructions are stored on the computer readable storage medium and executed by the processor via the computer readable memory.

* * * * *